United States Patent [19]

Walton

[11] 4,036,692
[45] July 19, 1977

[54] NUCLEAR FUEL ELEMENT NUT RETAINER CUP

[75] Inventor: Lewis Anthony Walton, Lynchburg, Va.

[73] Assignee: The Babcock & Wilcox Company, New York, N.Y.

[21] Appl. No.: 601,000

[22] Filed: Aug. 1, 1975

[51] Int. Cl.² .................... G21C 3/30; F16B 43/00
[52] U.S. Cl. ............................... 176/76; 151/69; 176/78
[58] Field of Search ............... 176/76, 78, 79; 151/55–60, 69

[56] References Cited

U.S. PATENT DOCUMENTS

| 1,201,444 | 10/1916 | Davis | 151/55 |
| 1,212,918 | 1/1917 | Dobbins | 151/55 |
| 2,385,777 | 10/1945 | Ebert | 151/55 |
| 2,431,735 | 12/1947 | Cyr | 151/55 |
| 2,737,222 | 3/1956 | Becker | 151/69 |
| 3,125,760 | 3/1964 | Foster | 176/41 |
| 3,142,627 | 7/1964 | Emerson | 176/78 |
| 3,276,967 | 10/1966 | Dodd | 176/66 |
| 3,431,170 | 3/1969 | Lass | 176/78 |

Primary Examiner—Samuel W. Engle
Assistant Examiner—Donald P. Walsh
Attorney, Agent, or Firm—J. M. Maguire; J. P. Sinnott; A. Notaro

[57] ABSTRACT

A typical embodiment has an end fitting for a nuclear reactor fuel element that is joined to the control rod guide tubes by means of a nut plate assembly. The nut plate assembly has an array of nuts, each engaging the respective threaded end of the control rod guide tubes. The nuts, moreover, are retained on the plate during handling and before fuel element assembly by means of hollow cylindrical locking cups that are brazed to the plate and loosely circumscribe the individual enclosed nuts. After the nuts are threaded onto the respective guide tube ends, the locking cups are partially deformed to prevent one or more of the nuts from working loose during reactor operation. The locking cups also prevent loose or broken end fitting parts from becoming entrained in the reactor coolant.

1 Claim, 6 Drawing Figures

NUCLEAR FUEL ELEMENT NUT RETAINER CUP

BACKGROUND OF THE INVENION

1. Field of the Invention

This invention relates to fuel elements for nuclear reactors and, more particularly to locking nut structures for fuel element end fittings, and the like.

2. Description of the Prior Art

To generate power, a charge of uranium is disposed within the core of a nuclear reactor, usually in uranium dioxide pellets that are loaded into metal tubes, or fuel rods. Groups of these fuel rods are assembled into fuel elements in which the fuel element structure supports the rods and maintains a proper spacing between these rods to enable pressurized water, or any other suitable coolant, to flow past the rods and absorb from the rods the heat that is generated through the nuclear processes that occur in the uranium.

Because the fuel rods usually are supported vertically, that is, with the central axes of the tubes perpendicular to the earth's surface, the tube ends are positioned between "upper" and "lower" end fittings. In some types of fuel elements, these end fittings support the associated fuel rods by restraining these rods between the two fittings. A number of techniques have been devised to join the end fittings into an integral fuel element. Typically, members that extend beyond the length of the fuel element have threaded ends which protrude through the end fittings. Special nuts are torqued onto the threaded ends and, in this manner, join the end fittings to the balance of the fuel element structure.

Because of the dynamic forces that characterize the coolant flowing through the fuel element, thermal expansion and contraction, and the like, there is a genuine possibility that one or more of these nuts might work loose and fall off the fuel element, thereby weakening the fuel element and doing possible damage to the reactor system. To prevent this from occuring, proposals have been advanced to weld the nuts to the end fitting in order to insure that the nuts will not disengage the threaded end of the member to which it joined.

The need nevertheless arises to remove these nuts in order to disassemble fuel elements for any number of reasons, e.g., failed fuel rod location, inspection and replacement. Frequently, the nuts must be unthreaded using remote handling equipment because of the radioactive environment. In these circumstances the difficulties and expense of fuel element disassembly and assembly are compounded by these designs in which each nut must be handled separately.

Accordingly there is a need to provide some means for engaging the ends of the members that protrude through the end fittings without risking broken or loose parts within the reactor system. It is clear that there also is a need for a more efficient way to engage and disengage the nuts with these threaded ends that is specifically adaptable to remote handling equipment and procedures.

SUMMARY OF THE INVENTION

These and other needs are satisfied, to a large extent, through the practice of the invention. More particularly, the lower end fitting of a nuclear fuel element is provided with a nut plate assembly. Typically, the nut plate assembly is a generally rectangular framework, network or gridiron of connected links that intersect to form nodes. These points of intersection, or nodes, each have respective apertures that are perpendicular to the plane of the gridiron. Hollow cylindrical locking cups are brazed or otherwise secured to the nodes. These locking cups are in axial alignment, each with a respective one of the nodes and protrude below the plane of the gridiron. The locking cups, moreover, each receive and enclose a nut within the cup surface. One or more detents protruding from the wall of each locking cup inwardly toward the particular cup's axis restrain the nut and extend into a recess in the outer surface of the nut to prevent the nut from falling out of the cup during fuel element assembly, disassembly, and at other times when these nuts are not engaged with the threaded members.

During fuel element assemby, the upper surface of the gridiron is moved toward the lower surface of the lower end fitting, the gridiron being oriented to align the node apertures with the threaded ends of the members that protrude below the lower surface of the end fitting.

In these circumstances, the individual nuts within the locking cups are engaged with the threads on the respective protruding members and are torqued an appropriate amount to join the end fittings to the fuel element structure.

The fully torqued nuts then are secured in place by deforming the lowermost ends of the locking cups to obstruct the nuts and preventing the nuts from working loose or "backing off".

To disassemble the fuel element, the nuts within the locking cups are unthreaded or "backed off" from the respective protruding members. As a part of this unthreading procedure, the nuts generally press the deformities out of the locking cups and the inwardly protruding detents on the locking cups prevent the nuts from falling out of the cups when the cup deformations have been removed.

Thus, the invention generally prevents broken nuts and protruding members, as well as unthreaded nuts from falling off the lower end fitting because the circumscribing locking cups are fixed to the gridiron and will "catch" the loose or broken parts.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

DETAILED DESCRIPTION OF THE PREFERRED EMBODIMENTS

Figure 1:
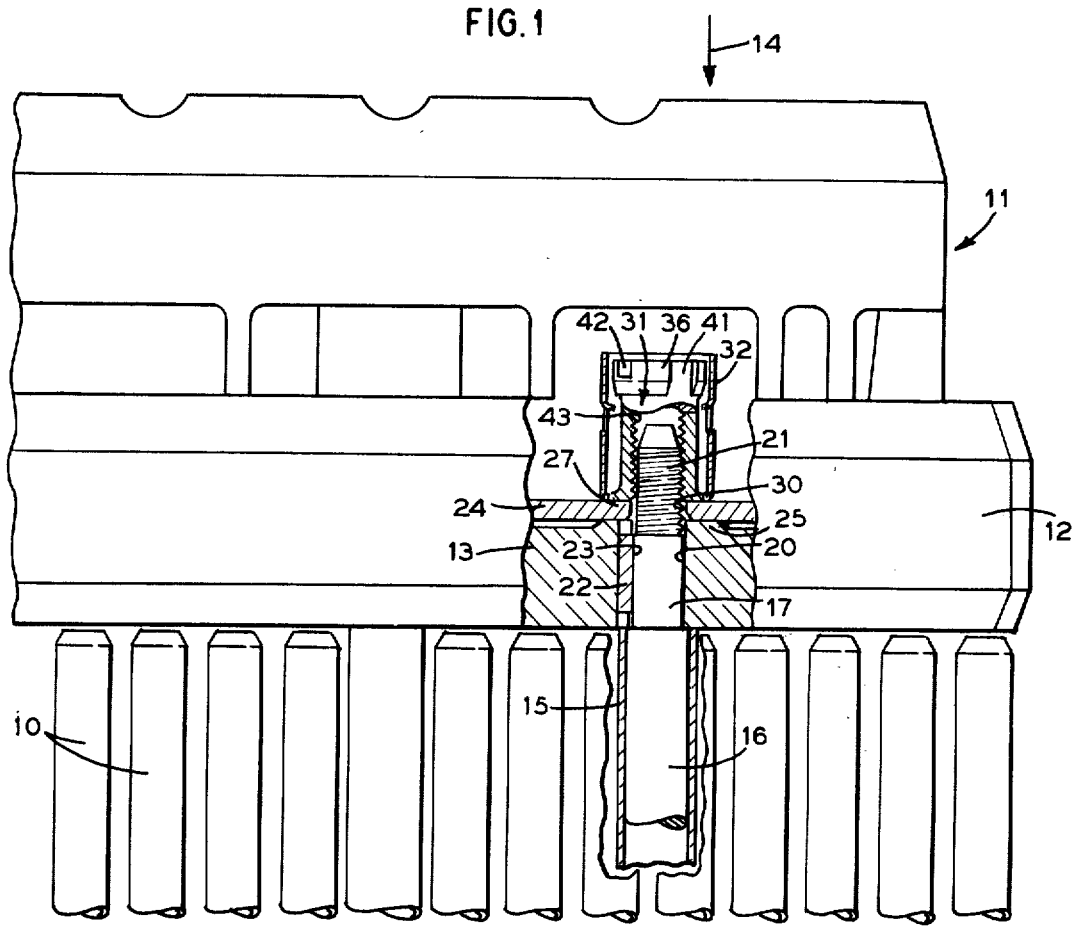
FIG. 1 is a side elevation in partial section of a portion of a fuel element for a nuclear reactor that embodies principles of the invention.

For a more complete appreciation of the invention, attention is invited to FIG. 1 of the accompanying drawing. As shown, a parallel array of fuel rods 10 terminate in a transverse plane that is adjacent to an end fitting 11.

For simplicity in description, the illustrative end fitting 11 (shown in an inverted position in FIG. 1) is subsequently referred to throughout the specification as a lower end fitting (i.e., the bottom or lowermost fitting for a fuel element in which the longitudinal axes of the fuel rods 10 are positioned vertically, or perpendicular to the horizontal plane) but the principles of the invention nevertheless are equally applicable to an end fitting in any desired orientation relative to the horizontal. Thus, it should be understood that the scope of the invention as claimed hereinafter is applicable to an end fitting in any desired angular relationship with the horizontal or other selected reference.

Considering FIG. 1 in more detail, the end fitting 11 has a peripheral band 12 that circumscribes the perimeter of a thick plate 13. The plate 13 is disposed in a plane that is perpendicular to the longitudinal axes of the fuel rods 10. Although not shown in the drawing, the plate 13 is of relatively open construction, having a number of apertures or passageways to enable coolant that is flowing in the direction of arrow 14 to pass in a relatively unimpeded manner through the end fitting 11 and to enter the bundle of fuel rods in order to absorb heat from the rods 10.

It will be recalled that longitudinal members are distributed within the bundle of fuel rods. These members, which may be part of the control rod guide tube assembly, a portion of which is shown as a tube or spacer sleeve 15, is typical, abut one side of the plate 13 in the end fitting 11. As shown, the tube 15 houses a generally thin and solid cylindrical plug 16 that is received within the hollow interior of the tube 15 and protrudes from the abutting end of the tube 15. An end portion 17 of the plug 16 that protrudes from the tube 15 is sufficiently long to extend through an aperture 20 that is formed in the plate 13 in order to expose a threaded shank 21 on the side of the plate 13 that is disposed away from the fuel rods 10. It should be noted that the inside diameter of the tube 15 is greater than the diameter of the aperture 20 to permit the open end of the tube 15 to abut the perpendicular surface of the plate 13. A key 22 is secured within the aperture 20 in order to engage a longitudinally disposed flat surface 23 that is formed in the end portion 17 of the end plug 16.

Figure 2:
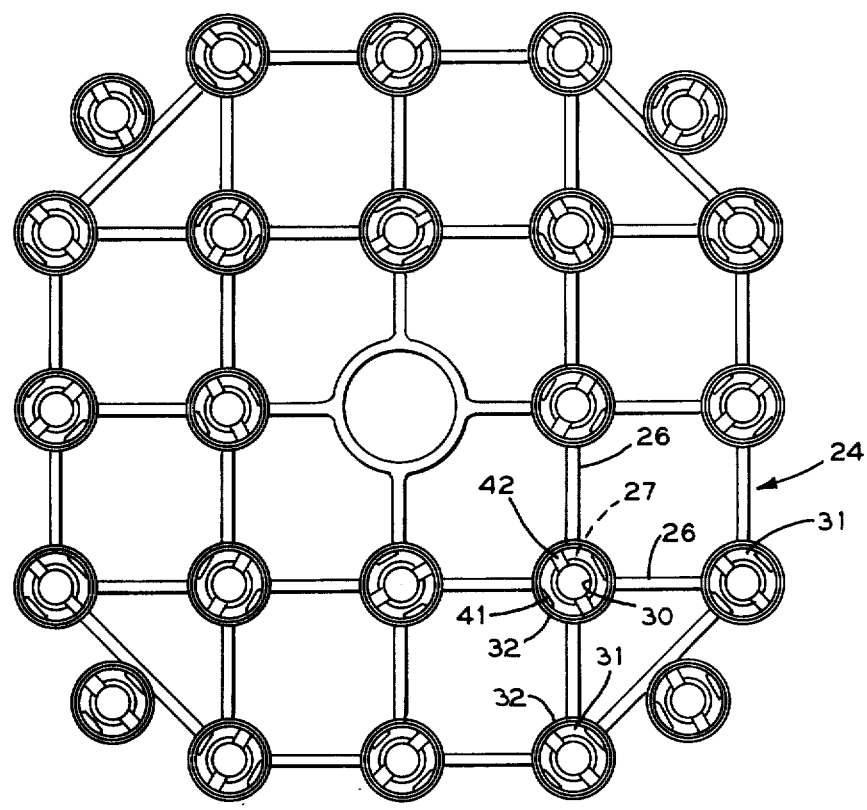
FIG. 2 is a bottom view of a nut plate assembly suitable for use in the fuel element that is shown in FIG. 1.

The end portion 17 also protrudes through a nut plate 24 that is pressed against a boss 25 which is formed on the surface of the plate 13 that is not in contact with the guide tube 15. The nut plate 24 is generally perpendicular to the common longitudinal axis of the guide tube 15 and the associated end plug 16. The nut plate 24, moreover, also is parallel to those surfaces of the plate 13 which are perpendicular to the longitudinal axis of the guide tube 15. As shown in FIG. 2, the nut plate 24 comprises a generally rectangular lattice or gridiron of linking members 26 that intersect (FIG. 3) to form nodes 27. Each of these nodes 27 has a centrally disposed aperture 30 that is sufficiently large to enable the end portion 17 (FIG. 1) in the plug 16 to protrude through. The positions of the nodes in the lattice relative to each other, moreover, matches the relative orientation of the end portions 17 that protrude from the fuel element. Nuts 31, illustrated in FIGS. 2 and 3, are enclosed in respective locking cups 32 which secure these nuts 31 to the respective nodes 27 on the framework for the nut plate 24.

Figure 4:
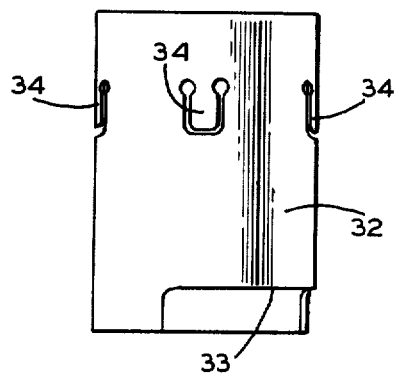
FIG. 4 is a side elevation of a locking cup that can be used with the nut plate assembly illustrated in FIGS. 2 and 3.
Figure 3:
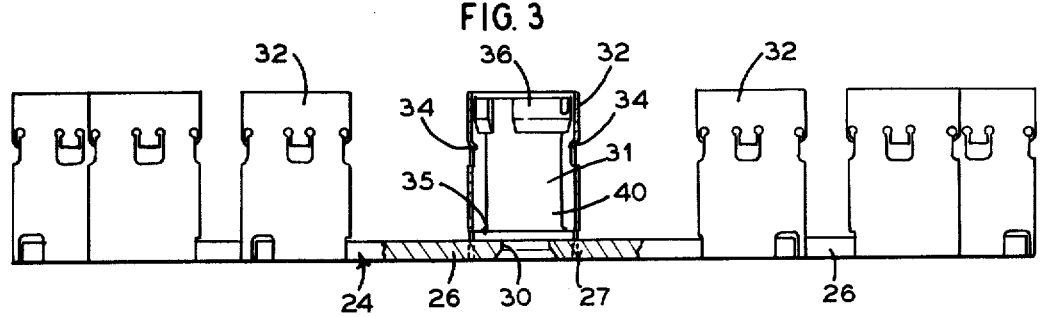
FIG. 3 is a side elevation of the nut plate assembly that is shown in FIG. 2, in partial section.

More specifically, attention is invited to FIG. 4 which shows a typical one of the locking cups 32 that are shown in FIG. 3. Typically, the locking cup 32 is a hollow metal cylinder that has a cylindrical portion cut-away 33 on the end which is to be joined to the framework for the nut plate 24 that is illustrated in FIG. 3. The specific shape of the cut-away portion 33 is varied to accommodate the angular relation between the linking members 26 (FIG. 3) that form a particular one of the nodes 27 to which the locking cup 32 is fastened through brazing, or the like.

Turning once more to FIG. 4, an array of ears 34 are punched or stamped in the side of the locking cup 32. Further in this respect, the ears 34 are formed on the portion of the cup that is spaced from the cut-away portion 33.

Figure 5:
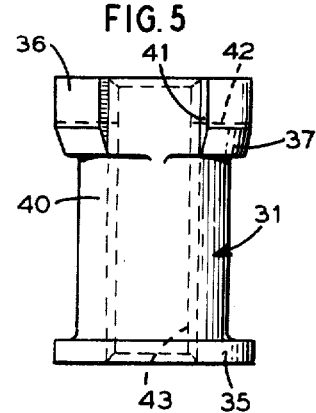
FIG. 5 is a side elevation of a typical nut use in connection with the invention.

FIG. 5 illustrates a typical one of the nuts 31 for partial enclosure within a respective one of the locking cups 32. As shown, the external surface of the nut in FIG. 5 has the general appearance of a spool in which a flange 35 on one transverse end is matched by an incomplete or interrupted flange 36 on the opposite transverse end of the nut 31. The interrupted flange 36, which forms the head of the nut 31, has a greater longitudinal depth than the flange 35, the flange 36 being finished flush with the transverse end of the nut, and having a chamfer 37 that joins the flange 36 to shank 40 in the central portion of the nut 31. The flange 36 also is interrupted by two slots, only slot 41 being visible in the FIG. 5 projection. A further kerf or slot 42 is formed in the head of the nut 31 to provide a more secure grip for an installation tool. There is, of course, a central tapped hole 43 within the nut 31 that is in alignment with the longitudinal axis of the nut 31.

A typical nut and locking cup assembly on the frame of the nut plate 24 is shown in FIG. 3. Thus, the nut 31 is loosely received within the locking cup 32, the outside diameters of the flanges 35 and 36 being significantly smaller than the inside diameter of the locking cup 32. The nut 31 is retained within the locking cup 32 in spite of the orientation of the nut plate 24 with respect to the horizontal because the ears 34 have been bent to protrude in toward the nut 31 and extend into the recess that is formed by the shank 40 and the flanges 35 and 36. In this respect, it should be noted that the longitudinal distance between the bent portions of the ears 34 and the opposite surface of the flange 35 is sufficient to enable the nut 31 to be completely unthreaded from the shank 21 (FIG. 1). In this way, the combination of the ears and the flanges enable the nut to be retained as a part of the unitary nut plate structure during every stage of fuel element assembly and disassembly.

In operation, as shown in FIG. 1, the aperture 30 in the node 27 on the nut plate 24 is aligned with the respective threaded shank 21 that protrudes from the plate 13. The nut plate 24 is pressed against the plate 13 and the threaded shank 21 that protrudes from the plate 13 engages the tapped central hole 43 in nut 31. A tool is inserted into the slot 42 on the nut 31 and the nut is threaded onto the shank 21. The key 22, moreover, presses against the flat surface 23 on the end portion 17 to prevent the shank, as well as the entire control rod drive tube 15, from turning with the nut 31 and thereby frustrating efforts to thread the nut onto the shank 21. Finally, the nut 41 is torqued to some acceptable predetermined value in order to join the plate 13 to the fuel element structure. The end of the locking cup 32 that is adjacent to the slots 41 is crushed or deformed, to a certain extent, in order to closely engage the nut surface and prevent the nut 31 from working loose or falling from the nut plate 24 if the end portion 17 should break, by means of the tool shown in FIG. 6 as described subsequently in more complete detail.

Figure 6:
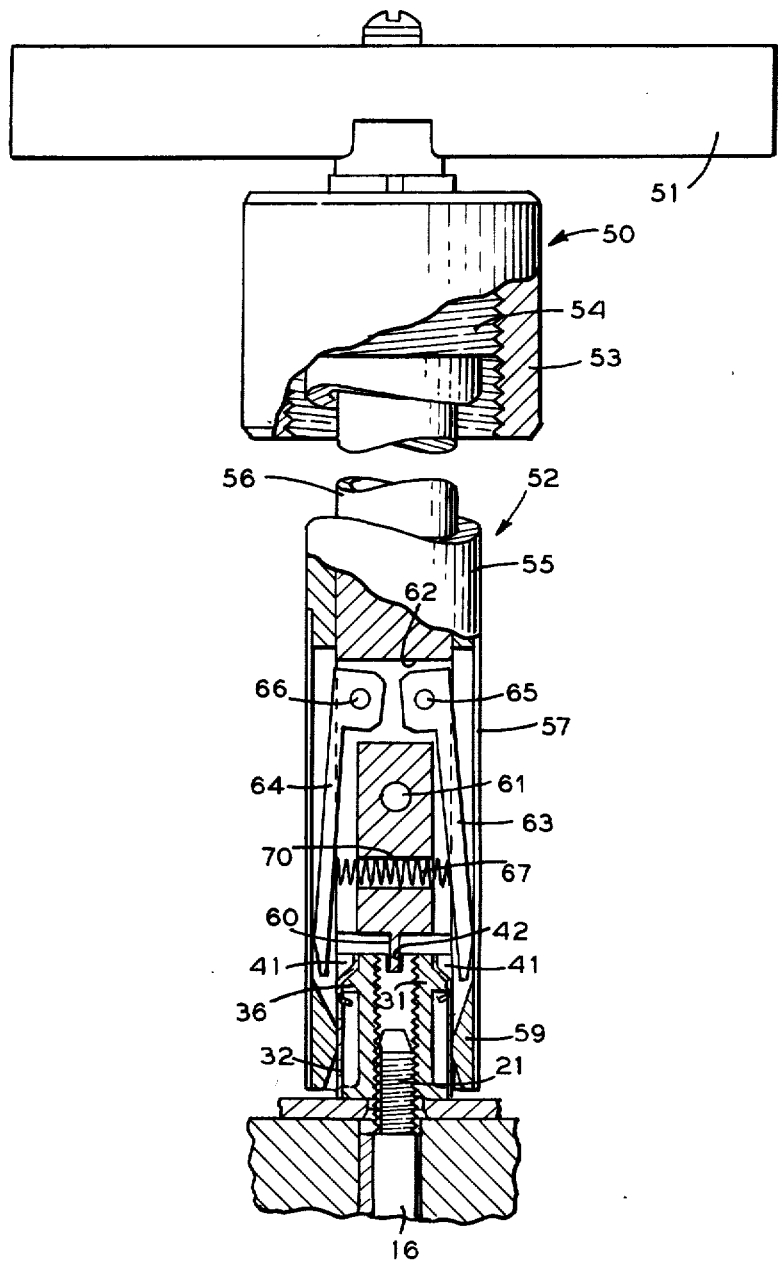
FIG. 6 is a front elevation in full section of a tool for use in connection with the invention.

To remove the nut 31 from the threaded shank 21, the tool illustrated in FIG. 6 is once more engaged with the slot 42 and the nut is unthreaded from the shank 21, the flange 36 presses the crushed or deformed portion (not shown) of the locking cup 32 back into a shape that approximate the original illustrated in FIG. 4. After the nut 31 and the other nuts (not shown in FIG. 1) on the nut assembly 24 have been unthreaded, the nut assembly can be withdrawn from the plate 13 and stored as a single unit for further use without risking the loss of one of the nuts, dropping a broken threaded shank 21, and the like.

Because the nut plate assembly 24 is one integral unit, even while being disengaged as well as when disengaged from the plate 13 and the protruding end portions 17 of the tubes 15, the structure that characterizes the invention is particularly useful when remote handling equipment must be used to disassemble a fuel element because of radioactivity.

As shown in FIG. 6, a typical device for selectively locking and unlocking the nut 31 is illustrated. For example, a tool 50 has a handle 51 for advancing and rotating a sleeved shaft 52 on the tool 50. The shaft 52 is coupled to the handle 51 through an internally threaded collar 53 that engages threading 54 on the end of outer sleeve 55 on the shaft 52 in order to move the outer sleeve 55 in an axial direction relative to a central shaft 56 that is received within the outer sleeve 55.

The end of the shaft 52 that is opposite the handle 51 terminates in a tubular portion 57 that matches the outside diameter of the outer sleeve 55 to which it is joined. The tubular portion 57 ends in an aperture which has an internal, chamfered lead-in 59 to align and guide the tool 50 over the outer surface of the locking cup 32. Within the locking cup 32, the nut 31 is threaded onto the shank 21 of the plug 16. To thread the nut 31 onto the plug 16, the slot 42 on the nut 31 receives working end 60 of the central shaft 56. As shown in FIG. 6, the portion of the central shaft 56 that is next to the working end 60 has a transversely disposed pin 61 that protrudes beyond the outside diameter of the central shaft 56 in order to move in slotted guides (not shown) in the outer sleeve 55 that are disposed in an axial direction relative to the longitudinal axis of the central shaft 56. In this way, the working end 60 is able to move axially, but can not rotate independently of the rotation of the entire handle 51 and the sleeved shaft 52.

A transverse passageway 62 also is formed in the central shaft near the pin 61 to accommodate a pair of downwardly disposed and pivoted locking teeth 63 and 64. The locking teeth 63 and 64 are pivoted about respective pins 65 and 66 to the central shaft 56. The locking teeth 63 and 64, moreover are urged against the inner surface of the tubular portion 57 by means of a biasing spring 67. As shown, the spring 67 is transversely disposed within a passageway 70 that is formed in the portion of the central shaft 56 that is located between the pin 61 and the working end 60.

In operation, the tool 50 is engaged with the outer surface of the cup 32 and entire tool is rotated under a small axial pressure until the working end 60 is received in the kerf 42. When engagement is accomplished in the foregoing manner, the tool 50 is rotated to thread the nut 31 onto the plug 16 until a suitable torque is achieved.

The threaded collar 53 then is rotated to draw the tubular portion 57 in an axial direction that is away from the nut 31. This action forces the locking teeth 63, 64 inwardly and against the slots 41 in the nut 31 as the teeth come abreast of the narrow inner surface of the tubular portion 57 that is caused by the chamfered lead-in 59.

The inward movement of the locking teeth 63, 64 swages the locking tube into the slots 41 in the upper shoulder of the nut 31.

The embodiments of the invention in which an exclusive property or privilege is claimed are defined as follows:

1. A nut plate for a nuclear reactor fuel element in which the fuel element has an array of end portions for engaging the nut plate comprising a plurality of linking members joined together to form a lattice of said linking members, nodes formed by said linking members where said linking members are joined together, at least some of said nodes having apertures formed therein, each of said apertures being positioned relative to the other of said nodes in a disposition that matches the fuel element end portion array, a plurality of hollow locking cups, each individual one of said cups being secured to said network of linking members at a respective one of said apertured nodes and in general alignment with said respective node aperture, a plurality of nuts, each individual one of said nuts being received within a respective one of said locking cups, for engagement between said individual nuts and at least some of the respective fuel element end portions and a flange formed on said nut, and an ear formed on said locking cup protruding toward said nut and spaced from said nut flange to selectively engage said flange whereby said ear and flange combination permits said nuts to be fully disengaged from the fuel element end portions but prevents said nuts from being fully withdrawn from said respective cups.

* * * * *